United States Patent [19]
Howard

[11] 3,799,721
[45] Mar. 26, 1974

[54] ADJUSTABLE MOLD PLATEN FOR FABRIC MOLDING

[75] Inventor: Jack E. Howard, Los Angeles, Calif.

[73] Assignee: International Fabric Molders, Inc., Los Angeles, Calif.

[22] Filed: May 18, 1972

[21] Appl. No.: 254,493

[52] U.S. Cl.................... 425/195, 248/23, 425/472
[51] Int. Cl............................................... B29c 1/16
[58] Field of Search...... 83/699, 700; 425/190, 195, 425/472; 248/23

[56] References Cited
UNITED STATES PATENTS

| | | | |
|---|---|---|---|
| 1,939,478 | 12/1933 | Whistler | 83/700 X |
| 2,601,341 | 6/1952 | Stacy | 425/195 |
| 2,718,662 | 9/1955 | Bohannon et al. | 425/190 X |
| 2,930,271 | 3/1960 | Whistler, Sr. et al. | 83/700 X |
| 1,501,162 | 7/1924 | Camfer | 83/700 X |
| 1,646,145 | 10/1927 | Gray | 83/700 X |
| 2,934,384 | 4/1960 | Sloyan | 248/23 X |
| 3,496,822 | 2/1970 | Nuchols et al. | 83/100 X |

Primary Examiner—Robert L. Spicer, Jr.
Attorney, Agent, or Firm—Robert C. Comstock

[57] ABSTRACT

An adjustable platen for holding molds used in forming flat pieces of fabric into three-dimensional garments. A flat rectangular platen has a plurality of transversely directed slots. A plurality of parallel holding members extend longitudinally across the platen and are transversely adjustable by means of fastening members which extend through the slots. Each holding member has a channel in which a plurality of inverted T-nuts are mounted for sliding longitudinal movement to engage fastening members holding the molds. The combination of transverse and longitudinally adjustability permits substantially universal positioning of the molds.

5 Claims, 7 Drawing Figures

PATENTED MAR 26 1974  3,799,721
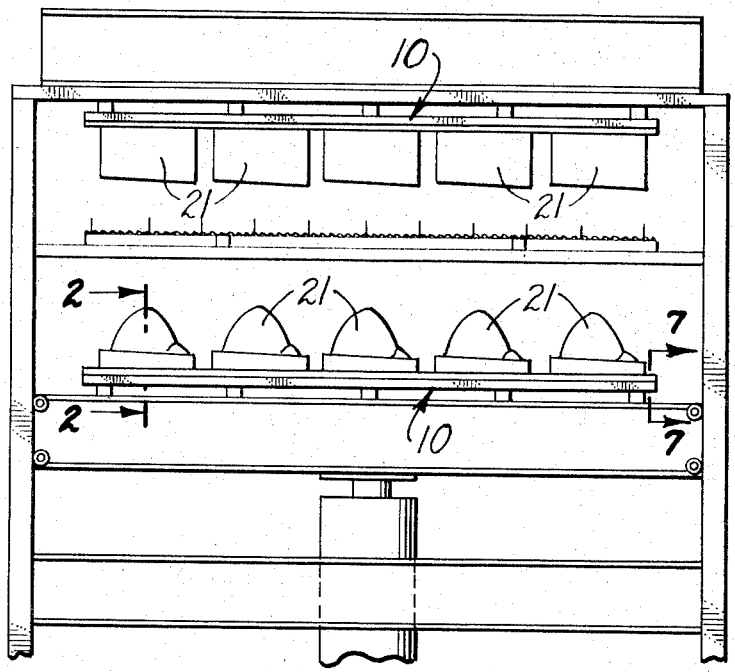
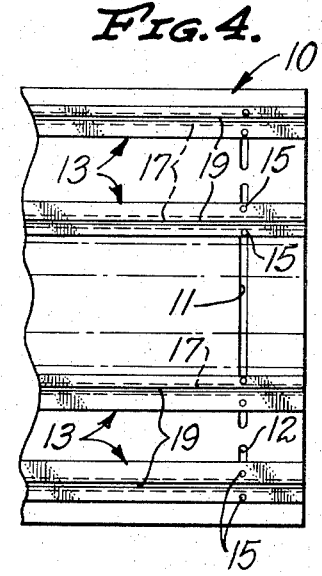
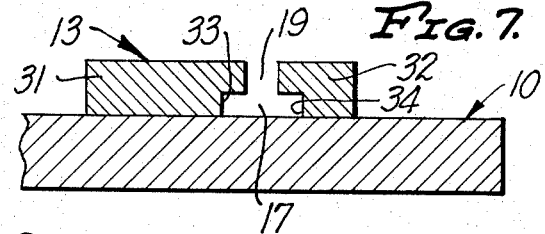
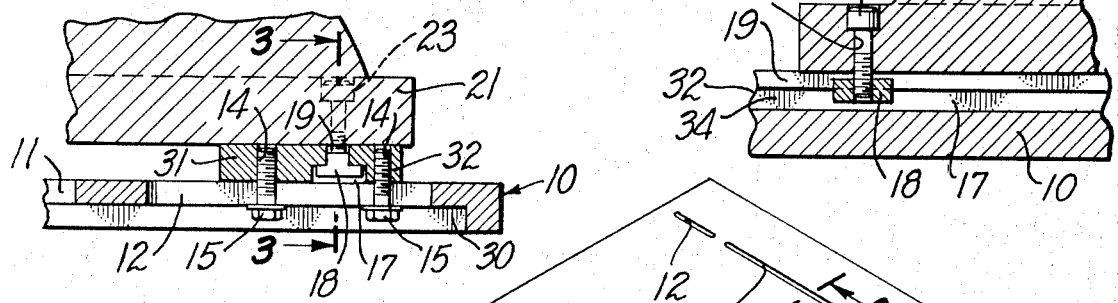
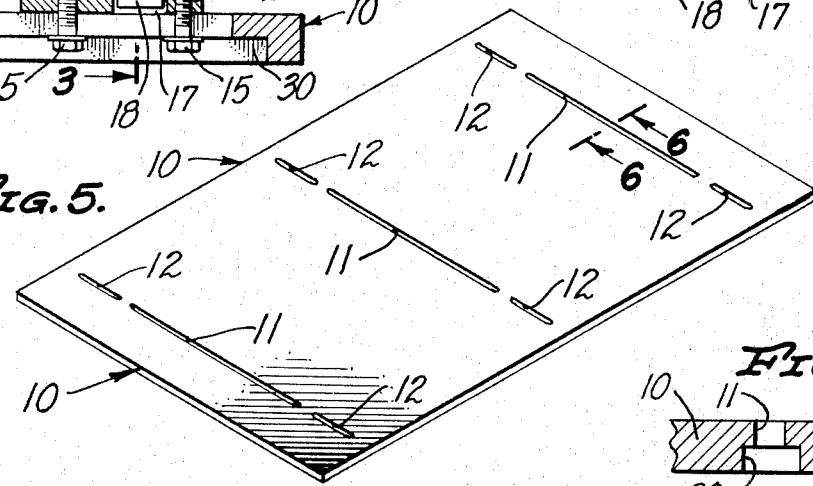
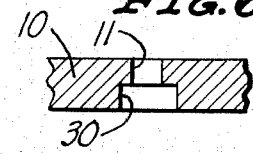

13,799,721

ADJUSTABLE MOLD PLATEN FOR FABRIC MOLDING

BACKGROUND OF THE INVENTION

1. Field of the Invention

The invention relates to an adjustable platen for holding molds such as those used in molding flat pieces of fabric into three dimensional shapes for use as breast cups, brassieres, swim suits and other garments or parts thereof.

2. Description of the Prior Art

In such molding operations, efficiency requires that a large number of mold halves be mounted in close proximity to each other on a single platen. Since the molds vary in size and shape, difficulty is encountered when they must be changed.

At the present time, a plurality of openings are drilled in the mold platen and the positioning of the molds or mold parts must always correspond to the positioning of the openings or else new openings must be drilled. Adjustment of the positioning of various sizes and types of molds is accordingly difficult and time consuming because the required degree and type of flexibility of mold positioning is not provided.

The problem is complicated further by the fact that the stretching parameters of the fabric are limited and the molds must accordingly be oriented so that their positioning does not require stretching of the fabric beyond its capability or desirable limits.

SUMMARY OF THE INVENTION

The present invention provides an adjustable mold platen which furnishes virtually unlimited variability and adjustability in the positioning of the molds without drilling any additional openings in the platen. The positioning of the molds and the mold holding means are simple, rapid and economical and require no structural changes in the platen.

The embodiment selected to illustrate the invention comprises a mold holding platen which has one or more pairs of parallel complementary undercut nut holding members. A plurality of nuts are longitudinally movable along a channel defined by these holding members to any desired longitudinal positions. At the same time, the holding members themselves are transversely movable with respect to the platen. The combination of longitudinal and transverse movability provides the desired flexibility for accommodating all of the varying requirements of mold positioning which arise in the molding of fabrics.

In its simplest form, the invention provides an adjustable structure for holding a plurality of molds which utilizes a plurality of elongated parallel holding members which extend in one direction across a platen and which are transversely adjustable. Fastening members holding the molds are longitudinally adjustable along the holding members.

It is accordingly among the objects of the invention to provide an adjustable mold platen having all of the advantages and benefits set forth above and described in detail hereinafter in this specification.

Another object of the invention is to provide such a platen in which the arrangement of the molds can be varied as desired quickly and without drilling openings in the platen.

A further object of the invention is to provide such a platen which is simple to utilize and change, to provide greater manufacturing efficiency and economy.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a side elevational view of a mold press showing a plurality of male and female molds mounted on adjustable platens of the present invention;

FIG. 2 is a sectional view taken on line 2—2 of FIG. 1;

FIG. 3 is a sectional view taken on line 3—3 of FIG. 2;

FIG. 4 is a top plan view of an end portion of a platen, with a plurality of holding members mounted thereon;

FIG. 5 is an isometric view of the top of a platen;

FIG. 6 is a sectional view taken on line 6—6 of FIG. 5;

FIG. 7 is a sectional view taken on line 7—7 of FIG. 1.

DESCRIPTION OF THE PREFERRED EMBODIMENT

A preferred embodiment which has been selected to illustrate the invention comprises a substantially rectangular flat platen 10, which is customarily formed of metal. The platen 10 is provided with transversely directed slots adjacent each end thereof and adjacent the center. The slots comprise three long center slots 11, adjacent the opposite ends of each of which are a pair of aligned short end slots 12.

Removably mounted on the top of the platen 10 are a plurality of longitudinally directed elongated holding members 13. The holding members 13 are provided adjacent their opposite ends and center with screw threaded openings 14 which are adapted to be aligned with the slots 11 and 12. A threaded socket screw 15 extends vertically upwardly through one of the slots 11 or 12 into each of the openings 14. A recess 30 is provided beneath each of the slots 11 and 12 for accommodating the heads of the screws 15.

Each of the holding members 13 comprises a pair of complementary bars 31 and 32 which are provided with inverted L-shaped cutaway portions 33 and 34 respectively. The cutaway portions 33 and 34 are directed toward each other so that they combine to provide a channel 17 which extends longitudinally along the platen 10. The channel 17 is dimensioned to slidably receive the heads of a plurality of inverted T-nuts 18. The adjacent edges of each pair of bars 31 and 32 are spaced a short distance apart from each other so that they define an elongated slot 19 which connects with the channel 17 therebeneath. The slots 19 are adapted to slidably receive the shanks 20 of the T-nuts 18.

A plurality of molds 21 (which may comprise the male or female half of a complete mold) are customarily mounted on each platen 10. Each mold 21 is customarily provided with two mold mounting openings 22, which are disposed adjacent the lower edges of the mold, usually diagonally opposite each other. Each opening 22 is diametrically enlarged at its upper end to receive the head of a bolt 23 which extends through the opening 22 and is threadedly engaged at its lower end with one of the T-nuts 18.

Each row of molds 21 accordingly requires two holding members 13 which are transversely spaced from each other by a distance corresponding to the lateral spacing of the openings 22, which is in turn determined by the dimensions and angular positioning of the molds 21. The size of the molds and the number of molds mounted on the platen may be varied in any manner desired, within the size limits of the platen.

Whenever the molds 21 are first arranged on the platen 10, a plurality of holding members 13 are placed in desired positions across the width of the platen 10 and held in place by the screws 15 which extend through the slots 11 and 12. The molds 21 are then mounted and secured in place by the bolts 23 which extend into the T-nuts 18 which are slid along the channels 17 and slots 19 into positions beneath the openings 22.

Whenever the molds 21 are to be changed or rearranged, the bolts 23 are removed to permit removal and changing of the molds and the T-nuts 18 may be slidably moved to other positions along the channels 17 and slots 19. If greater or lesser spacing is desired between the holding members 13, the screws 15 may be loosened and the holding members 13 moved transversely along the slots 11 and 12 to any positions desired.

It will be noted that no drilling is required, universal mounting is available and the time required for mounting and changing the molds and mold arrangement is an absolute minimum. The operation of the device is so simple that it can be performed by unskilled labor.

The same type of platen can be used for mounting male molds, as shown in the lower part of FIG. 1, and for the complementarily formed female molds, as shown in the upper part of FIG. 1. The complementary mold parts are, of course, vertically aligned with each other.

Since the holding members 13 are adjustable transversely across the platen 10 and the T-nuts 18 and bolts 23 are longitudinally adjustable along the holding members 13, substantially universal adjustability is provided.

I claim:

1. A structure for adjustably holding a plurality of molds for molding flat pieces of fabric into three dimensional shapes for garments, said structure comprising a substantially flat platen, slot means extending transversely across substantially the entire width of said platen adjacent to each of the opposite ends of said platen, a plurality of elongated holding members extending substantially parallel to each other in a longitudinal direction along substantially the entire length of said platen, each of said holding members comprising a pair of laterally adjustable bars, each pair of bars having complementarily formed cut-away portions facing each other to form a continuous inverted T-shaped channel, a plurality of fastening means having portions disposed for longitudinal sliding movement in each of said channels and portions extending through said molds for securing said molds to said holding members, and a plurality of fastening members extending through each of said slot means and connected to each of said bars to adjustably secure said bars in any desired positions transversely across said platen, to provide both longitudinal and transverse adjustability of the positioning of said molds with respect to said platen.

2. The structure described in claim 1, each of said slot means having a continuous recess at the lower end thereof of wider diameter and a plurality of inverted fastening members extending upwardly from beneath said platen and connected to said bars, the heads of said fastening members being disposed within said recess.

3. The structure described in claim 2, and additional slot means extending transversely across the midportion of said platen, and additional fastening members extending through said additional slot means and connected to each of said bars to hold the midportions of said bars in any desired position transversely across said platen.

4. The structure described in claim 3, said fastening means for securing said molds to said holding members comprising a plurality of inverted T-nuts disposed in said inverted T-shaped channels and a plurality of fasteners extending through said molds and engaging said T-nuts.

5. The structure described in claim 4, each of said slot means comprising a pair of short slots disposed adjacent to the side edges of said platen and a long slot extending across the midportion of said platen.

* * * * *

UNITED STATES PATENT OFFICE
CERTIFICATE OF CORRECTION

Patent No. 3,799,721  Dated March 26, 1974

Inventor(s) Jack E. Howard

It is certified that error appears in the above-identified patent and that said Letters Patent are hereby corrected as shown below:

Column 2, lines 56-63 should read as follows:

the platen 10. The channel 17 is inverted T-shape in cross section. The lower portion of channel 17 is dimensioned to slidably receive the heads of a plurality of inverted T-nuts 18. The upper portion 19 of the channel 17 is of narrower diameter and is adapted to slidably receive the shanks of the T-nuts 18.

Signed and Sealed this ninth Day of December 1975

[SEAL]

Attest:

RUTH C. MASON
*Attesting Officer*

C. MARSHALL DANN
*Commissioner of Patents and Trademarks*